United States Patent
Chen

(10) Patent No.: US 11,770,606 B2
(45) Date of Patent: Sep. 26, 2023

(54) INFORMATION CAPTURING DEVICE AND OPERATING METHOD THEREOF, AND CONTROL METHOD OF POSITIONING UNIT

(71) Applicant: Getac Technology Corporation, Hsinchu County (TW)

(72) Inventor: Min-Tai Chen, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 97 days.

(21) Appl. No.: 17/401,421

(22) Filed: Aug. 13, 2021

(65) Prior Publication Data

US 2022/0132045 A1 Apr. 28, 2022

(30) Foreign Application Priority Data

Oct. 23, 2020 (CN) .......................... 202011149223.6

(51) Int. Cl.
*G01S 19/14* (2010.01)
*H04N 23/65* (2023.01)

(52) U.S. Cl.
CPC ........... *H04N 23/651* (2023.01); *G01S 19/14* (2013.01)

(58) Field of Classification Search
CPC .......................... H04N 5/232411; G01S 19/14
USPC ....................................................... 348/158
See application file for complete search history.

(56) References Cited

U.S. PATENT DOCUMENTS

| 11,443,631 | B2 * | 9/2022 | Manohar | G08G 1/04 |
| 2013/0162852 | A1 * | 6/2013 | Boyle | H04N 23/6812 |
| | | | | 348/211.99 |
| 2020/0333473 | A1 * | 10/2020 | Imamura | G01S 19/52 |

OTHER PUBLICATIONS

Jp2006338723, Hiroki Matsubara, Electronic still camera, 2006, IP.com (Year: 2006).*

* cited by examiner

Primary Examiner — Nathan J Flynn
Assistant Examiner — Caroline Somera
(74) Attorney, Agent, or Firm — Locke Lord LLP; Tim Tingkang Xia, Esq.

(57) ABSTRACT

An information capturing device includes a positioning unit, an audiovisual recording unit and a control unit. The positioning unit tracks and acquires multiple satellite signals and calculates positioning data and a moving speed according to the satellite signals. The control unit is activated the audiovisual recording to perform audiovisual recording and controls the positioning unit to enter a first operation mode. In the first operation mode, the positioning unit updates positioning data according to a first cycle. While the audiovisual recording is performed, the control unit reads the moving speed from the positioning unit, and the control unit controls the positioning unit to switch to a second operation mode when the moving speed is less than or equal to a first threshold. In the second operation mode, the positioning unit updates the positioning data according to a second cycle longer than the first cycle.

17 Claims, 4 Drawing Sheets

INFORMATION CAPTURING DEVICE AND OPERATING METHOD THEREOF, AND CONTROL METHOD OF POSITIONING UNIT

CROSS-REFERENCE TO RELATED PATENT APPLICATION

The application claims priority to a Chinese Patent Application No. 202011149223.6, filed on Oct. 23, 2020, the disclosure of which is also hereby incorporated by reference herein in its entirety.

BACKGROUND OF THE INVENTION

Field of the Invention

The present invention relates to a technology of information capturing devices, and more particularly, to an information capturing device, a control method of a positioning unit and an operating method of an information capturing device.

Description of the Prior Art

A current police body-worn camera (BWC) is powered by a battery to maintain operation, a recording function of the device frequently consumes power, and a positioning function configured for the device also needs to constantly collect data and perform calculation, resulting in a substantial load on the battery. Over an extended on-duty period of a police officer, the power of the battery may become rapidly depleted.

SUMMARY OF THE INVENTION

In one embodiment, an operating method of an information device includes: activating a recording operation of the information capturing device, and controlling a positioning unit of the information capturing device to enter a first operation mode; during execution of the recording operation, reading a moving speed of the information capturing device from the positioning unit; comparing the moving speed with a first threshold; and controlling the positioning unit to switch from the first operation mode to a second operation mode when the moving speed is less than or equal to the first threshold. In the first operation mode, the positioning unit updates, according to a first cycle, positioning data generated by the positioning unit. In the second operation mode, the positioning unit updates, according to a second cycle longer than the first cycle, the positioning data generated by the positioning unit.

In one embodiment, an information capturing device includes a positioning unit, an audiovisual recording unit and a control unit. The positioning unit tracks and acquires a plurality of satellite signals, and calculates positioning data and a moving speed according to the plurality of satellite signals. The control unit, coupled to the positioning unit and the audiovisual recording unit, activates an audiovisual recording unit of the information capturing device to perform audiovisual recording and controls the positioning unit to enter a first operation mode. In the first operation mode, the positioning unit updates positioning data according to a first cycle. During the audiovisual recording, the control unit reads the moving speed from the positioning unit, and the control controls the positioning unit to switch to a second operation mode when the moving speed is less than or equal to a first threshold. In the second operation mode, the positioning unit updates the positioning data according to a second cycle longer than the first cycle.

In one embodiment, a control method of an operation mode of a positioning unit includes: reading a moving speed from the positioning unit, comparing the moving speed with a first threshold, and controlling the positioning unit to switch from a first operation mode to a second operation mode when the moving speed is less than or equal to the first threshold. In the first operation mode, the positioning unit updates, according to a first cycle, positioning data generated by the positioning unit. In the second operation mode, the positioning unit updates, according to the second cycle, the positioning data generated by the positioning unit.

In conclusion, the information capturing device, the control method of an operation mode of a positioning unit and the operating method of an information capturing device according to any of the embodiments are capable of allowing the information capturing device to change an update cycle of the positioning unit according to a moving speed, thereby achieving a power-saving effect.

DETAILED DESCRIPTION OF THE EMBODIMENTS

Figure 1:
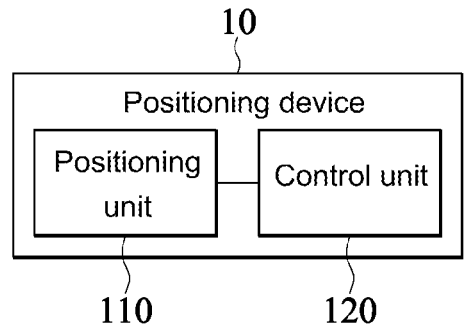
FIG. 1 is a brief schematic block diagram of a positioning device according to an embodiment.

Referring to FIG. 1, a positioning device 10 includes a positioning unit 110 and a control unit 120, wherein the control unit 120 is coupled to the positioning unit 110.

Herein, the positioning unit 110 is configured to track and acquire a plurality of satellite signals, and to calculate positioning data and a moving speed of the positioning device 10 according to the plurality of satellite signals. In one embodiment, the position unit 110 may be, for example, a Global Positioning System (GPS). For example, when the positioning unit 110 is activated, the positioning unit 110 first enters a tracking phase to continually search for satellites in the sky and receive and calculate satellite signals from the satellites to generate positioning data (e.g., position fixes). Once the positioning unit 110 has obtained enough satellite signals, the positioning unit 110 enters a power optimization phase to repeated the following operation so as to reduce power consumption: tracking a part of satellite signals of the plurality of satellites found on the basis of the satellite signals, receiving and calculate a part of the satellite signals to generate positioning data (e.g., position fixes), and entering an idle state. Alternatively, the positioning unit 110 enters an inactive phase, such that the positioning unit 110 is turned off and waits until the next round of initiatively searching for satellites and receiving satellite signals, for example, entering an acquisition phase and subsequently entering the tracking phase or returning to the inactive phase.

Herein, the control unit 120 is configured to control an operation mode of the positioning unit 110 according to the moving speed of the positioning device 10.

Figure 2:
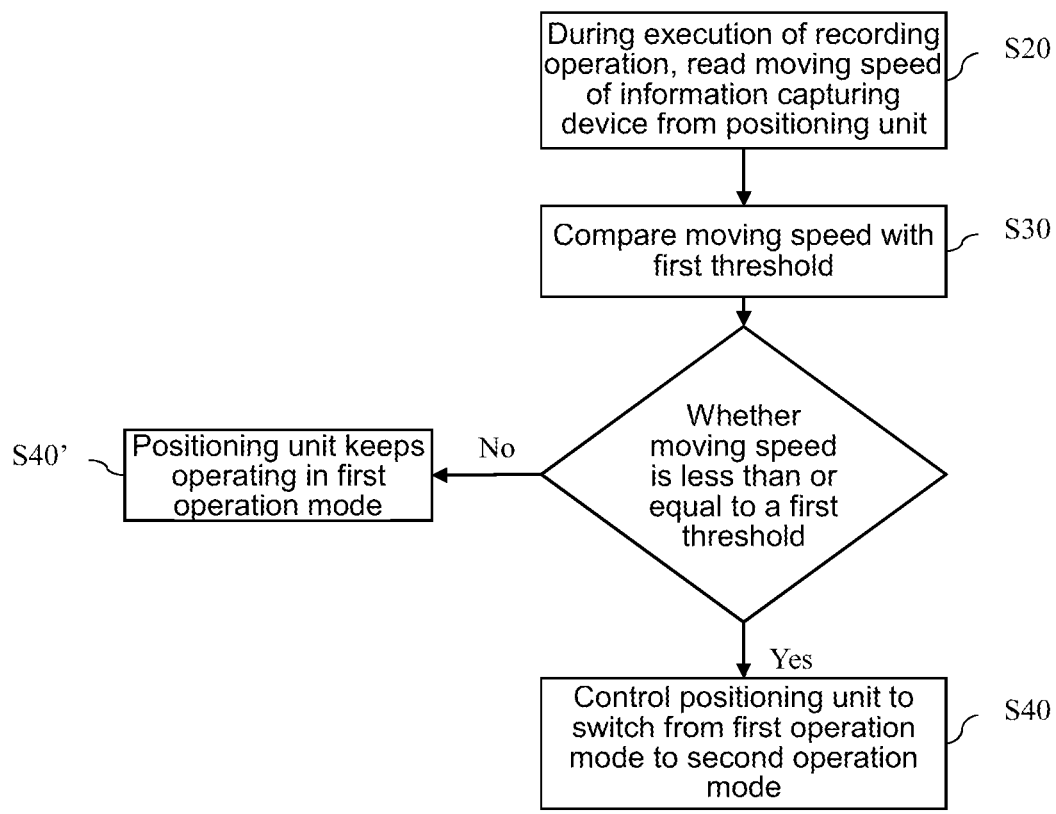
FIG. 2 is a schematic flowchart of a control method of an operation mode of a positioning unit according to an embodiment.

In some embodiments, referring to FIG. 1 and FIG. 2, the control unit 120 reads the current moving speed of the positioning device 10 from the positioning unit 110 (step S20), and compares the read moving speed with a first threshold (step S30).

When the moving speed is less than or equal to the first threshold, the control unit 120 controls the positioning unit 110 to switch to a second operation mode (step S40). In the first operation mode, the positioning unit 110 updates the positioning data according to a first cycle, and in the second operation mode, the positioning unit 110 updates the positioning data according to a second cycle, wherein the second cycle is longer than the first cycle. Conversely, when the moving speed is not less than or equal to the first threshold, the control unit 120 does not change the operation mode of the positioning unit 110, that is, the positioning unit 110 keeps operating in the first operation mode (step S40'). In one example, in the first operation mode, the positioning unit 110 is activated once at an interval of a first period, so as to perform transmission of the positioning data in a second period with the control unit 120. In the second operation mode, the positioning unit 110 is activated once at an interval of a third period, so as to perform transmission of the positioning data in a fourth period with the control unit 120. The first period is shorter than the third period, the second period may the same or different from the fourth period, the first period is longer than the second period, and the third period is longer than the fourth period.

In some embodiments, in the first operation mode and the second operation mode, the positioning unit 110 is normally in an idle state.

In one example, in the first operation mode, the positioning unit 110 is activated once at an interval of the first period to search for satellites, track satellites, receive satellite signals and calculate satellite signals so as to generate the positioning data, transmits the generated positioning data to the control unit 120 in the second period, and returns to the idle state after the second period ends. In the second operation mode, the positioning unit 110 is activated once at an interval of the third period to search for satellites, track satellites, receive satellite signals and calculate satellite signals so as to generate the positioning data, transmits the generated positioning data to the control unit 120 in the fourth period, and returns to the idle state after the fourth period ends.

Figure 3:
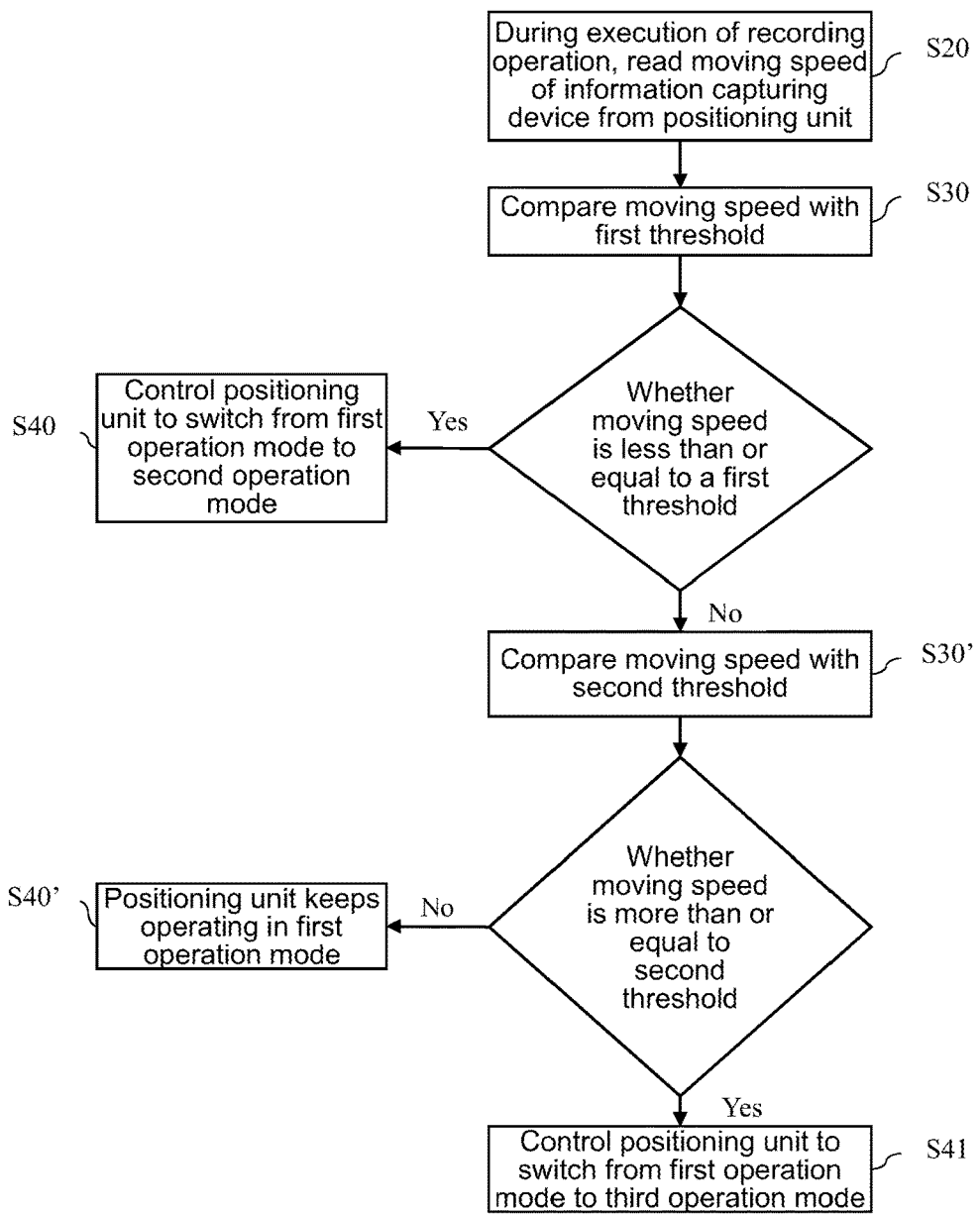
FIG. 3 is a schematic flowchart of a control method of an operation mode of a positioning unit according to another embodiment.

In some other embodiments, referring to FIG. 1 and FIG. 3, the control unit 120 further compares the read moving speed with a second threshold (step S30'). When the current moving speed is more than or equal to the second threshold, the control unit 120 controls the positioning unit 110 to switch to a third operation mode (step S41). In the third operation mode, the positioning unit 110 updates the positioning data according to a third cycle, wherein the second threshold is more than the first threshold, and the third cycle is shorter than the first cycle. In one example, in the third operation mode, the positioning unit 110 is activated once at an interval of a fifth period, so as to transmit the positioning data in a sixth period with the control unit 120. The fifth period is shorter than the first period, the second period may be the same or different from the sixth period, and the fifth period is longer than the sixth period.

When the current moving speed is more than the first threshold and less than the second threshold, the control unit 120 does not change the operation mode of the positioning unit 110, that is, the positioning unit 110 keeps operating in the first operation mode (step S40').

In some embodiments, in the first operation, the second operation mode and the third operation mode, the positioning unit 110 is normally in the idle state.

In one example, in the third operation mode, the positioning unit 110 is activated once at an interval of the fifth period to search for satellites, track satellites, receive satellite signals and calculate satellite signals so as to generate the positioning data, transmits the generated positioning data to the control unit 120 in the sixth period, and returns to the idle state after the second period ends.

In some embodiments, the positioning unit 10 may be a portable electronic apparatus having a positioning function, such as an information capturing device, a navigation device, a mobile phone. An information capturing device 100 is taken as an example in the following description.

Figure 4:
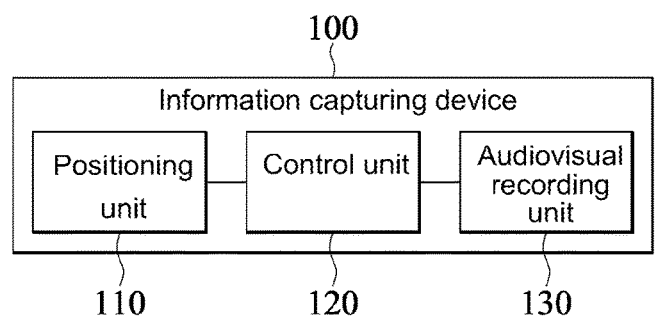
FIG. 4 is a brief schematic block diagram of an information capturing device according to an embodiment.

FIG. 4 shows a brief schematic block diagram of an information capturing device according to an embodiment. Referring to FIG. 4, the information capturing device 100 includes a positioning unit 110, an audiovisual recording unit 130 and a control unit 120. The control unit 120 is coupled to the positioning unit 110 and the audiovisual recording unit 130. In one embodiment, the information capturing device 100 may be, for example but not limited to, a police BWC, a sports camera and a wearable video camera.

The positioning unit 110 is configured to track satellites, acquire a plurality of satellite signals of the satellites, and calculate positioning data and a moving speed according to the plurality of satellite signals.

Figure 5:
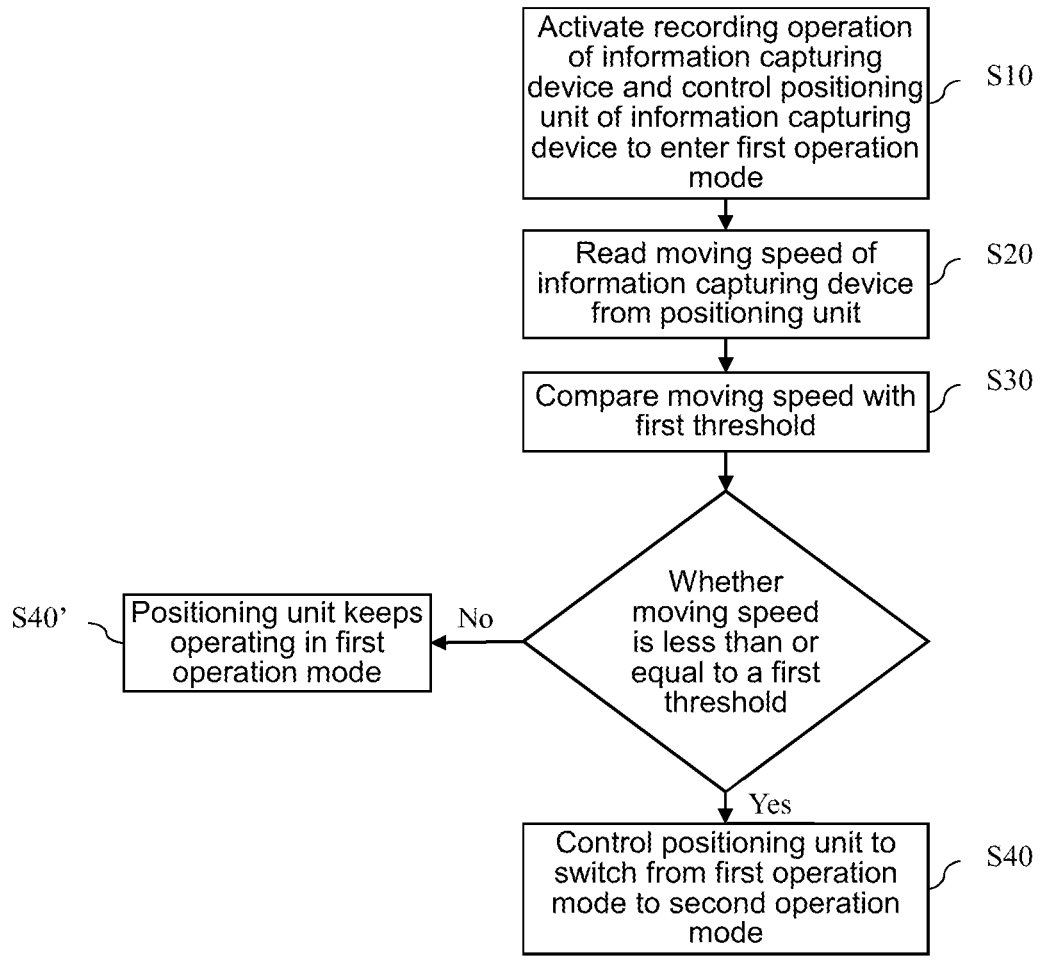
FIG. 5 is a schematic flowchart of an operating method of an information capturing device according to an embodiment.

The control unit 120 is configured to control operations of the components. Referring to FIG. 4 and FIG. 5, when the control unit 120 activates a recording operation of the audiovisual recording unit 130 (that is, when the audiovisual recording unit 130 starts audiovisual recording), the control unit 120 concurrently controls the positioning unit 110 to enter a first operation mode (step S10) so that the positioning unit 110 operates in the first operation mode. In the first operation mode, the positioning unit 110 updates the positioning data according to the first cycle.

During execution of the recording operation (that is, while the audiovisual recording unit 130 performs audiovisual recording), the control unit 120 reads the current moving speed of the information capturing device 100 from the positioning unit 110 (step S20), and compares the read moving speed with the first threshold (step S30). When the moving speed is less than or equal to the first threshold, the control unit 120 controls the positioning unit 110 to switch to the second operation mode (step S40). In the second operation mode, the positioning unit 110 updates the positioning data according to the second cycle, wherein the second cycle is longer than the first cycle. Conversely, when the moving speed is more than the first threshold, the control unit 120 does not change the operation mode of the positioning unit 110, that is, the positioning unit 110 keeps operating in the first operation mode (step S40').

In one example, the information capturing device 100 is applied to a police BWC, which is worn on a police officer and moves along with the police officer in patrol. Assume that the first threshold is 30 km/h. When the current moving speed is 50 km/h (i.e., more than the first threshold), the positioning unit 110 operates according to an update cycle of updating the positioning data once every five seconds (i.e., the first cycle). In other words, the positioning unit 110 is activated once at an interval of every seconds from the idle state, so as to search for satellites, track satellites, receive satellite signals, generate the positioning data based on the satellite signals, and output the positioning data to the control unit 120, and then returns to the idle state. When the current moving speed is 20 km/h (i.e., less than the first threshold), the control unit 120 controls the positioning unit 110 to switch to operate according to an update cycle of updating the positioning data once every ten seconds (i.e., the second cycle). In other words, the positioning unit 110 is activated once at an interval of every ten seconds from the idle state, so as to search for satellites, track satellites, receive satellite signals, generate the positioning data based on the satellite signals, and output the positioning data to the control unit 120, and then returns to the idle state.

When the current moving speed is slow, it means that the moving range of the information capturing device 100 is not large, and the positioning data within this moving range does not differ much, and so the positioning data of the updating unit 110 does not need to be updated frequently, thereby reducing the frequency of updating the positioning data of the positioning unit 110 and reducing power consumption.

Figure 6:
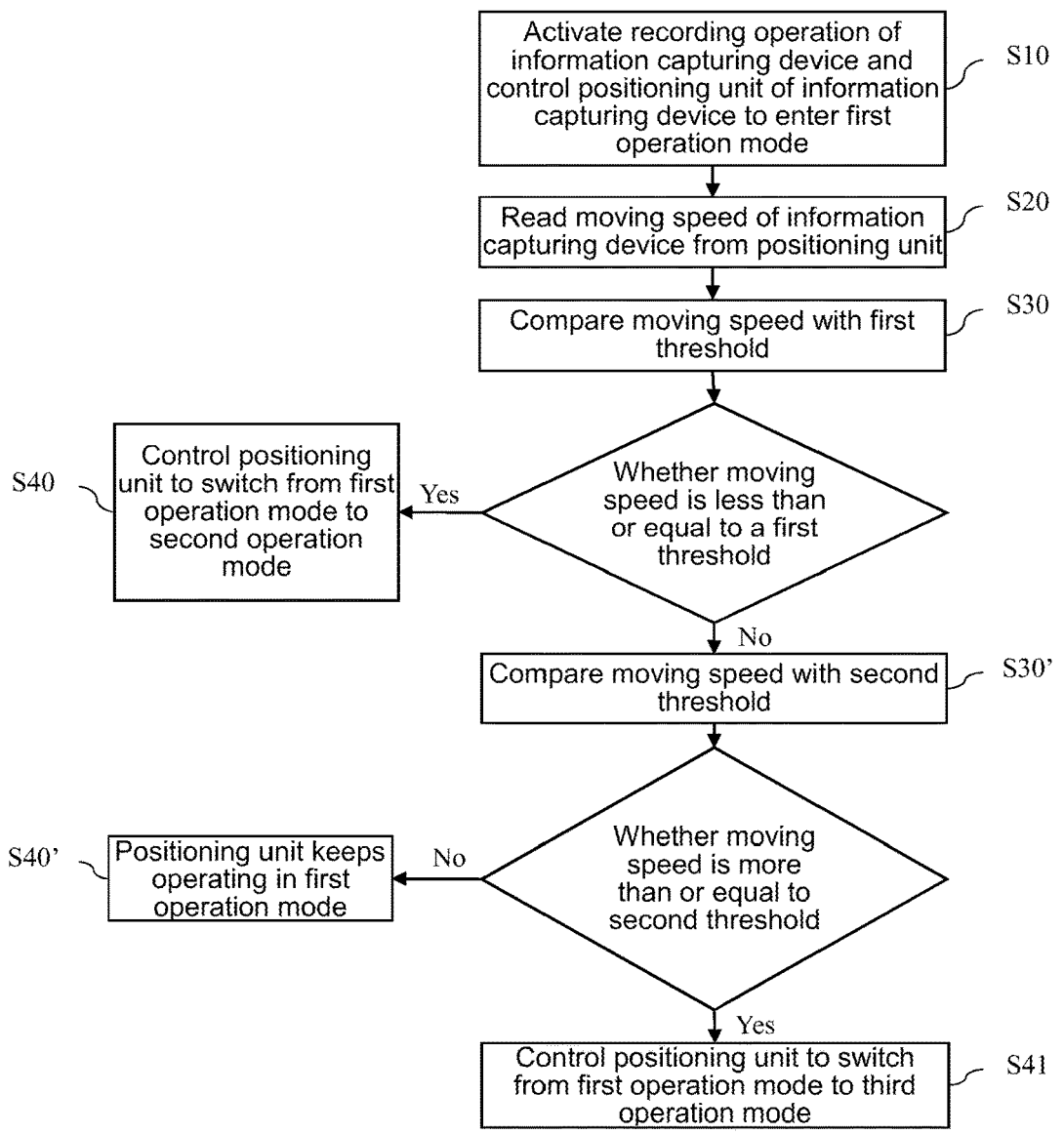
FIG. 6 is a schematic flowchart of an operating method of an information capturing device according to another embodiment.

Referring to FIG. 4 and FIG. 6, in some embodiments, the control unit 120 further compares the current moving speed with a second threshold (step S30'), wherein the second threshold is more than the first threshold.

When the current moving speed is more than or equal to the second threshold, the control unit 120 controls the positioning unit 110 to switch to operate in the third operation mode (step S41). In the third operation mode, the positioning unit 110 updates the positioning data according to the third cycle, wherein the third cycle is shorter than the first cycle.

In one example, assume that the first threshold is 30 km/h, and the second threshold is 100 km/h. The information capturing device 100 initially moves at a speed of 50 km/h. At this point, the positioning unit 110 operates according to an update cycle of updating the positioning data once every five seconds (i.e., the first cycle).

As the moving speed of the information capturing device 100 increases, the current moving speed read by the control unit 120 from the positioning unit 110 gradually increases. When the current moving speed read by the control unit 120 from the positioning unit 110 is 100 km/h (i.e., equal to the second threshold) or more than 100 km/h (i.e., more than the second threshold), the control unit 120 controls the positioning unit 110 to switch from the update cycle of updating the positioning data once every five seconds to operate according to an update cycle of updating the positioning data once every one second (i.e., the third cycle). In other words, the positioning unit 110 is activated once at an interval of one second from the idle state, so as to track satellites, receive satellite signals, generate the positioning data based on the satellite signals, and output the positioning data to the control unit 120, and then returns to the idle state.

As the moving speed of the information capturing device 100 decreases, the current moving speed read by the control unit 120 from the positioning speed 110 gradually decreases. When the current moving speed read by the control unit 120 from the positioning unit 110 is 30 km/h (i.e., equal to the first threshold) or less than 30 km/h (i.e., less than the first threshold), the control unit 120 controls the positioning unit 110 to switch from the update cycle of updating the positioning data once every five seconds to operate according to an update cycle of updating the positioning data once every ten seconds (i.e., the second cycle).

However, when the moving speed read by the control unit 120 from the positioning unit 110 is between 30 km/h and 100 km/h (e.g., 70 km/h) (i.e., more than the first threshold and less than the second threshold), the control unit 120 does not change the operation mode of the positioning unit 110, that is, the positioning unit 110 keeps operating according to the update cycle of updating the positioning data once every five seconds.

Thus, the information capturing device 100 is capable of controlling the positioning unit 110 to switch to different updating cycles according to the value of the current moving speed so as to update the positioning data.

In some embodiments, in the first operation mode, the positioning unit 110 is normally in the idle state. In one example, the positioning unit 110 is in the first operation mode, the positioning unit 110 operates according to the first cycle of updating the positioning data once every five seconds, and the positioning unit 110 is normally in the idle state within this interval of five seconds. The positioning unit 110 only needs to be woken up when the positioning data needs to be updated. In the idle state, the positioning unit 110 neither receives any new satellite signals nor transmits the positioning data, thereby reducing power consumption.

Figure 7:
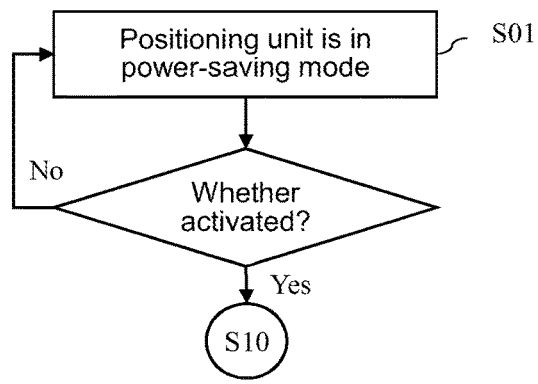
FIG. 7 is a schematic flowchart of an operating method of an information capturing device according to yet another embodiment.

In some embodiments, referring to FIG. 4 and FIG. 7, before the recording operation of the audiovisual recording unit 130 is activated, the positioning unit 110 is in a power-saving mode (step S01). In the power-saving mode, the positioning unit 110 is normally in an off state. Before the recording operation of the audiovisual recording unit 130 is activated, the positioning unit 110 operates in the power-saving mode.

When the control unit 120 activates the audiovisual recording unit 130 to start performing audiovisual recording, the control unit 120 concurrently controls the positioning unit 110 to enter the first operation mode from the power-saving mode (step S10).

In one example, in the power-saving mode, the positioning unit 110 operates according to an update cycle of updating the positioning data once every 100 seconds, and the positioning unit 110 is normally in the off state within this interval of one hundred seconds. The positioning unit 110 only needs to be activated when the positioning data needs to be updated to again search for satellites, and receive and calculate a plurality of satellite signals so as to generate the positioning data. It should be noted that the update cycle of 100 seconds is merely an example, and is not to be construed as a limitation.

For example, taking a GPS as the positioning unit 110 for instance, the power-saving mode of the positioning unit 110 may be a Power Save Mode ON/OFF (PSMOO). The first operation mode, the second operation mode and the third operation mode of the positioning unit 110 are Power Save Mode Cyclic Tracking (PSMCT) modes having different update cycles. In some embodiments, in the PSMCT mode, the update cycle of the positioning unit 110 is less than or equal to 10 seconds. In the PSMOO mode, the update cycle of the positioning unit 110 is more than 10 seconds, or even more than one minute, for example, 105 seconds.

In some embodiments, the positioning device 10 may further include a storage unit (not shown). The storage unit is coupled to the control unit 120. The foregoing first threshold (and second threshold and third threshold) may be set according to actual requirements and be stored in the storage unit. In some embodiments, the storage unit may be implemented by a memory. The memory may include, for example but not limited to, a volatile memory or a non-volatile memory such as a dynamic random access memory (DRAM), a static random access memory (SRAM), a read-only memory (ROM), a programmable read-only memory (PROM), an erasable programmable read-only memory (EPROM), an electrically-erasable programmable read-only memory (EEPROM), a hard disk drive (HDD) or a solid-state driver (SSD).

In some embodiments, the control unit 120 may be implemented by a system-on-chip (SoC), a central processing unit (CPU), a microcontroller unit (MCU), an embedded controller (EC), an application-specific integrated circuit (ASIC), an application processor (AP), or another other electronic component having operation and processing capabilities.

In some embodiments, the audiovisual recording unit 130 may be implemented by an audiovisual input apparatus including a camera lens and/or a microphone.

In conclusion, in some embodiments, the information capturing device, the control method of an operation mode of a positioning unit and an operation method of an information capturing device are capable of decreasing the frequency at which the positioning unit 110 updates the positioning data when the current moving speed is slow so as to save power consumption. In some embodiments, the information capturing device, the control method of an operation mode of a positioning unit and the operation method of an information capturing device are further capable of changing the update cycle of the positioning unit 110 according to the value of the moving speed, thereby effectively controlling power consumption without affecting the positioning effect of the positioning unit 110. While the invention has been described by way of example and in terms of the embodiments, it is to be understood that the invention is not limited thereto. Changes and modifications be made by a person skilled in the art without departing from the spirit and scope of the present invention are to be encompassed within the scope of the present invention. Therefore, the scope of protection of the present invention should be accorded with the appended claims.

What is claimed is:

1. An operation method of an information capturing device, comprising:
   providing the information capturing device, wherein the information capturing device comprises a positioning unit and an audiovisual recording unit, and the positioning unit is configured to switch between a first operation mode and a second operation mode, wherein in the first operation mode, the positioning unit updates, according to a first cycle, positioning data generated by the positioning unit in the second operation mode, the positioning unit updates, according to a second cycle longer than the first cycle, the positioning data generated by the positioning unit;
   activating a recording operation of the audiovisual recording unit of the information capturing device, and when the recording operation of the audiovisual recording unit is activated, concurrently controlling the positioning unit of the information capturing device to enter the first operation mode;
   during execution of the recording operation, reading a moving speed of the information capturing device from the positioning unit;
   comparing the moving speed with a first threshold; and
   when the moving speed is less than or equal to the first threshold, controlling the positioning unit to switch from the first operation mode to the second operation mode.

2. The operation method of an information capturing device according to claim 1, further comprising:
   when the moving speed is more than the first threshold, keeping operating the positioning unit in the first operation mode.

3. The operation method of an information capturing device according to claim 1, further comprising:
   comparing the moving speed with a second threshold, wherein the second threshold is greater than first threshold; and
   when the moving speed is more than or equal to the second threshold, controlling the positioning unit to switch to operate in a third operation mode;
   wherein, in the third operation mode, the positioning unit updates, according to a third cycle, the positioning data generated by the positioning unit, and the third cycle is shorter than the first cycle.

4. The operation method of an information capturing device according to claim 3, further comprising:
   when the moving speed is more than the first threshold and less than the second threshold, keeping operating the positioning unit in the first operation mode.

5. The operation method of an information capturing device according to claim 1, wherein in the first operation mode, the positioning unit is normally in an idle state.

6. The operation method of an information capturing device according to claim 4, wherein the positioning unit is in a power-saving mode before the recording operation is activated, and the positioning unit is in a normally off state in the power-saving mode.

7. An information capturing device, comprising:
   a positioning unit, tracking and acquiring a plurality of satellite signals, and calculating positioning data and a moving speed according to the plurality of satellite signals, wherein the positioning unit is configured to switch between a first operation mode and a second operation mode, wherein in the first operation mode, the positioning unit updates, according to a first cycle, positioning data generated by the positioning unit in the second operation mode, the positioning unit updates, according to a second cycle longer than the first cycle, the positioning data generated by the positioning unit;
   an audiovisual recording unit; and
   a control unit, coupled to the positioning unit and the audiovisual recording unit, activating the audiovisual recording unit of the information capturing device to perform audiovisual recording, and when the recording operation of the audiovisual recording unit is activated, concurrently controlling the positioning unit to enter the first operation mode;
   wherein, during the audiovisual recording, the control unit reads the moving speed from the positioning unit, and when the moving speed is less than or equal to the first threshold, the control unit controls the positioning unit to switch to the second operation mode.

8. The information capturing device according to claim 7, wherein when the moving speed is more than the first threshold, the positioning unit keeps operating in the first operation mode.

9. The information capturing device according to claim 7, wherein when the moving speed is more than or equal to a second threshold, the control unit controls the positioning unit to switch to a third operation mode, the second threshold is more than the first threshold, the positioning unit updates the positioning data according to a third cycle in the third operation mode, and the third cycle is shorter than the first cycle.

10. The information capturing device according to claim 9, wherein when the moving speed is more than the first threshold and less than the second threshold, the positioning unit keeps operating in the first operation mode.

11. The information capturing device according to claim 7, wherein in the first operation mode, the positioning unit is normally in an idle state.

12. The information capturing device according to claim 11, wherein before the recording operation is activated, the positioning unit is in a power-saving mode, and the positioning unit is in a normally off state in the power-saving mode.

13. A control method of an operation mode of a positioning unit, comprising:
   in an activation process, controlling the positioning unit to enter a first operation mode, wherein the positioning unit is configured to switch between the first operation mode and a second operation mode, wherein in the first operation mode, the positioning unit updates, according to a first cycle, positioning data generated by the positioning unit in the second operation mode, the positioning unit updates, according to a second cycle longer than the first cycle, the positioning data generated by the positioning unit;
   reading a moving speed from a positioning unit;
   comparing the moving speed with a first threshold; and
   when the moving speed is less than or equal to the first threshold, controlling the positioning unit to switch from the first operation mode to the second operation mode.

14. The control method of an operation mode of a positioning unit according to claim 13, further comprising:
   when the moving speed is more than the first threshold, keeping operating the positioning unit in the first operation mode.

15. The control method of an operation mode of a positioning unit according to claim 13, further comprising:
   comparing the moving speed with a second threshold, wherein the second threshold is more than the first threshold; and
   when the moving speed is more than or equal to the second threshold, controlling the positioning unit to switch to a third operation mode;
   wherein, in the third operation mode, the positioning unit updates, according to a third cycle, the positioning data generated by the positioning unit, and the third cycle is shorter than the first cycle.

16. The control method of an operation mode of a positioning unit according to claim 15, further comprising:
   when the moving speed is more than the first threshold and less than the second threshold, keeping operating the positioning unit in the first operation mode.

17. The control method of an operation mode of a positioning unit according to claim 13, wherein in the first operation mode, the positioning unit is normally in an idle state.

* * * * *